(12) United States Patent
Nemoto

(10) Patent No.: US 8,466,208 B2
(45) Date of Patent: Jun. 18, 2013

(54) CURABLE SHEET COMPOSITION

(75) Inventor: Takashi Nemoto, Hachioji (JP)

(73) Assignee: Three Bond Co., Ltd., Tokyo (JP)

( * ) Notice: Subject to any disclaimer, the term of this patent is extended or adjusted under 35 U.S.C. 154(b) by 205 days.

(21) Appl. No.: 12/740,268

(22) PCT Filed: Oct. 6, 2008

(86) PCT No.: PCT/JP2008/068515
§ 371 (c)(1),
(2), (4) Date: Apr. 28, 2010

(87) PCT Pub. No.: WO2009/057441
PCT Pub. Date: May 7, 2009

(65) Prior Publication Data
US 2010/0247924 A1    Sep. 30, 2010

(30) Foreign Application Priority Data
Oct. 30, 2007  (JP) .................................. 2007-282341

(51) Int. Cl.
*C08F 2/50* (2006.01)

(52) U.S. Cl.
USPC ................. 522/96; 522/90; 522/97; 522/173; 522/174; 522/178; 522/151; 522/152; 522/181; 522/182; 522/183

(58) Field of Classification Search
USPC .............. 522/90, 96, 97, 173, 174, 178, 181, 522/182, 183, 151, 152, 153
See application file for complete search history.

(56) References Cited

U.S. PATENT DOCUMENTS

| | | | | |
|---|---|---|---|---|
| 5,273,812 A | * | 12/1993 | Oguchi et al. | 428/220 |
| 5,922,238 A | * | 7/1999 | Savant et al. | 252/1 |
| 6,113,801 A | * | 9/2000 | Savant et al. | 252/1 |
| 2006/0208374 A1 | | 9/2006 | Shimotsuma et al. | |

FOREIGN PATENT DOCUMENTS

| | | |
|---|---|---|
| EP | 874027 | 10/1998 |
| EP | 1736519 | 12/2006 |
| JP | 07-017132 | 1/1995 |
| JP | 8-92342 | 4/1996 |
| JP | 2000-38546 | 2/2000 |
| JP | 2002-12635 | 1/2002 |
| JP | 2004-35600 | 2/2004 |
| JP | 2006-231917 | 9/2006 |
| JP | 2007-326917 | 12/2007 |

* cited by examiner

*Primary Examiner* — Sanza McClendon
(74) *Attorney, Agent, or Firm* — Dilworth & Barrese, LLP.

(57) ABSTRACT

A curable sheet composition able to follow up a mold shape under the application of heat and pressure, able to polymerize and cure upon being irradiated with light, permitting an optical element molding pattern to be fixed, and comprising 50% to 94% of a polycarbonate diol-modified urethane acrylate oligomer, 5% to 40% of a (meth)acrylate containing at least one carboxyl group in each molecule thereof, and 0.5% to 5% of a photopolymerization initiator.

12 Claims, No Drawings

CURABLE SHEET COMPOSITION

FIELD OF THE INVENTION

The present invention relates to a curable sheet composition. Particularly, the present invention is concerned with a curable sheet composition superior in adhesion to a glass substrate, also superior in transparency and weathering resistance, and permitting direct molding of an optical part or the like onto a glass substrate by being placed on the glass substrate and press-molded by a female mold.

BACKGROUND

As a molding method for optical parts such as lenses there has heretofore been known a method using liquid photocurable resin. However, in case of using liquid photocurable resin, there are problems such as it is difficult to maintain the film thickness constant, bubbles are mixed in the resin, and handling of the resin is troublesome. In view of these problems there has been proposed a lens molding method using a curable sheet composition (i.e., a sheet comprising a curable composition) (see JP 7-17132A).

In the conventional molding method using a curable sheet composition, an optical element pattern or the like is molded on a film or a film substrate. In this case, if direct molding is performed, that is, if a sheet is placed on a glass substrate and a female mold is pressed against the sheet to effect molding, problems related to durability have heretofore been encountered such as, for example, the sheet peels off from the glass surface when stripping the glass substrate-sheet combination from the female mold, which is due to poor adhesion of the sheet to the glass substrate, or peeling results from a long-term outdoor use.

On the other hand, as a direct molding method for a glass substrate there has been proposed such a method as is disclosed in JP 2006-231917A wherein a pasty curable composition is applied onto a female mold and then actinic light is radiated to the composition to cure the composition. In this conventional method, however, it is necessary to treat the glass substrate with a coupling agent in order to enhance the adhesion between the curable composition and the glass, resulting in increase in the number of steps. However, since the composition is pasty, there has been the problem that consideration must be given to the mixing of bubbles in the composition and treatment of a protruded portion.

DISCLOSURE OF THE INVENTION

Object of the Invention

It is an object of the present invention to provide a curable sheet composition able to easily follow up the shape of a female mold under the application of heat and pressure, able of polymerize and cure upon being irradiated with light, and permitting easy and positive fixing of an optical element molding pattern.

It is another object of the present invention to provide a curable sheet composition permitting direct molding of a lens pattern onto a glass substrate without pre-treatment such as treatment with a coupling agent for the glass substrate and, after curing, being superior in the adhesion to the glass substrate and also superior in transparency and weathering resistance.

SUMMARY OF THE INVENTION

The present invention firstly resides in a curable sheet composition being in a solid state at room temperature and capable of being liquefied and flowing upon heating, the curable sheet composition comprising
(A) 50 to 94% by weight of a urethane (meth)acrylate oligomer prepared by the reaction of a polycarbonate diol (a1), diisocyanate (a2), and a (meth)acrylate (a3) containing at least one hydroxyl group in molecule,
(B) 5 to 40% by weight of a (meth)acrylate containing at least one carboxyl group in molecule, and
(C) 0.3 to 10 by weight of a photopolymerization initiator.

The present invention secondly resides in a method for curing the above curable sheet composition, which method comprises applying the curable sheet composition onto a substrate such as glass, heating to a temperature of 40° to 100° C., thereby allowing the composition to soften or melt, and radiating actinic energy beam to the softened or melted composition to cure the composition.

The present invention thirdly resides in a molded product of the curable sheet composition resulting from being cured and molded by the above curing method, preferably an optical part such as a molded lens.

Effect of the Invention

Since the curable sheet composition of the present invention is a solid sheet at room temperature, it is superior in handleability, and it exhibits high adhesion to various substrates, thus permitting direct formation of an optical element onto, for example, a glass substrate without the need of any pretreatment. Moreover, such problems as inclusion of bubbles and protrusion do not occur during molding and it is possible to obtain a cured molded product superior in transparency and weathering resistance and hence possible to form an optical element suitable for long-term outdoor use.

EMBODIMENTS OF THE INVENTION

The present invention will now be described in detail. The curable sheet composition of the present invention is a sheet composition being in a solid state at room temperature, capable of being liquefied and flowing upon heating, and comprising:
(A) 50 to 94% by weight of a urethane (meth)acrylate oligomer prepared by the reaction of a polycarbonate diol (a1), a diisocyanate (a2), and a (meth)acrylate (a3) containing at least one hydroxyl group in molecule, (B) 5 to 40% by weight of a (meth)acrylate containing at least one carboxyl group in molecule, and (C) 0.3 to 10% by weight of a photopolymerization initiator.

The ingredient (A) used in the present invention is an ingredient necessary for making the curable sheet composition form a solid sheet at room temperature and which ingredient imparts flexibility and weathering resistance to a cured product of the composition. The ingredient (A) is a urethane (meth)acrylate oligomer prepared by the reaction of a polycarbonate diol (a1), a diisocyanate (a2) and a (meth)acrylate (a3) containing at least one hydroxyl group in molecule.

The polycarbonate diol (a1) is an oligomer (including polymer) having hydroxyl groups at both ends of a carbonate repeating unit. Typically, it can be prepared by the reaction of a diol compound and a diester compound in a stoichiometrically larger amount of the diol compound than the diester compound. In this case, as the diol compound it is preferable to use a diol compound having hydroxyl groups at both ends of a divalent aliphatic group having 4 to 6 main chain carbon atoms. As examples of divalent aliphatic groups having 4 to 6 main chain carbon atoms are mentioned aliphatic groups resulting from substitution of C4 to C6 alkylene groups or hydrogen atoms of the alkylene groups with, for example, alkyl, allyl, halogen, or halogenated alkyl. As examples of such diol compounds are mentioned 1,5-pentanediol, 1,6-hexanediol, 3-methyl-1,5-pentanediol, 2,4-diethyl-1,5-pentanediol, 1,4-butanediol, 3-fluoromethyl-1,5-pentanediol, and 3-fluoro-1,5-pentanediol. These compounds may be used each alone or in combination of two or more.

As the diester compound to be reacted with the dial diol compound in preparing the polycarbonate dial diol (a1), a carbonic acid diester compound is generally used preferably. As examples of carbonic acid diesters are mentioned ethylene carbonate, dimethyl carbonate, diethyl carbonate, di-n-propyl carbonate, diisopropyl carbonate, dibutyl carbonate, dicyclohexyl carbonate, and diphenyl carbonate. These compounds may be used each alone or in combination of two or more.

As the diisocyanate (a2) there may be used a suitable diisocyanate used in forming urethane. Examples are 2,4-tolylene diisocyanate, 4,4'-diphenylmethane diisocyanate, 4,4'-dicyclohexylmethane diisocyanate, 2,6-tolylene diisocyanate, 1,3-xylylene diisocyanate, 1,4-xylylene diisocyanate, tetramethylxylylene diisocyanate, hexamethylene diisocyanate, lysine diisocyanate, isophorone diisocyanate, bis(4-isocyanatocyclohexyl)methane, 1,3-bis(isocyanatomethyl)cyclohexane, 1,4-bis(isocyanatomethyl)cyclohexane, and norbornane diisocyanate. Above all, such saturated diisocyanates as isophorone diisocyanate and hexamethylene diisocyanate are preferred because they afford cured products superior in weathering resistance. Also preferred from the standpoint of adhesive property are isophorone diisocyanate, bis(4-isocyanatocyclohexyl)methane, 1,3-bis(isocyanatomethyl)cyclohexane, and 1,4-bis(isocyanatomethyl)cyclohexane.

The (meth)acrylate containing at least one hydroxyl group in molecule is a compound containing at least one hydroxyl group in the ester linkage of acrylate or methacrylate. Examples are mono(meth)acrylic acid esters of dihydric alcohols such as ethylene glycol, propylene glycol, 1,3-propanediol 1,3-butanediol, 1,4-butanediol, and polyethylene glycol, mono(meth)acrylic acid esters or di(meth)acrylic acid esters of trihydric alcohols such as trimethylolethane, trimethylolpropane, and glycerin, and mono- or di(meth)acrylic acid adducts of mono- or diglycidyl compounds such as phenylglycidyl ether, 2-ethyloxirane, styrene oxide, 1,4-phenydiglycidyl ether, ethylene glycol diglycidyl ether, 1,2-bis (glycidyloxy)propane, 2,3-butylene glycol diglycidyl ether, bisphenol A diglycidyl ether, and bisphenol F diglycidyl ether. These compounds may be used each alone or in combination of two or more.

By the term "(meth)acrylate" as used herein is meant acrylate and/or methacrylate.

Typically, the ingredient (A) used in the present invention can be represented as follows in the case where the polycarbonate diol (a1) is represented by HO—PC—OH, the diisocyanate (a2) is represented by OCN—R—NCO, and the (meth)acrylate (a3) containing at least one hydroxyl group in each molecule thereof is represented by CH2=CR'—COOR'—OH:

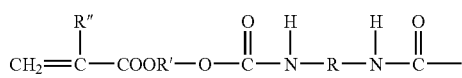

-continued

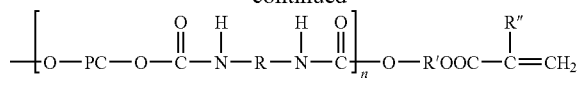

As a method for preparing the ingredient (A) there may be used a suitable known method used in forming the urethane linkage. In this case, the method is used in a quantitative relation such that the total amount of hydroxyl groups in the ingredients (a1) and (a3) and the amount of isocyanate groups in the ingredient (a2) are in a balanced state stoichiometrically. The three ingredients may be reacted at a time, or first the ingredients (a1) and (a2) may be reacted together to form an urethane oligomer having isocyanate groups at both ends and then the ingredient (a3) may be reacted with the urethane oligomer.

It is preferable that the ingredient (A) used in the present invention have a weight average molecular weight (Mw) in the range of 20,000 to 200,000, more preferably 40,000 to 100,000. If the value of Mw is less than 20,000, it will become difficult to maintain the composition in a state of sheet at room temperature, and if it exceeds 200,000, the composition will become difficult to flow on heating, with consequent deterioration in the adhesion to an adherend and difficulty of following up a mold.

It is preferable that a weight ratio of the ingredient (A) in the present invention be 50% to 94%, more preferably 60% to 80%. If it is less than 50%, it will become difficult to maintain the composition in a state of sheet at room temperature, and if it exceeds 94%, a cured product of the composition will become too hard to obtain a molded product.

The ingredient (B) used in the present invention is an ingredient which imparts adhesion to an adherend. The ingredient (B) is a (meth)acrylate having at least one carboxyl group in each molecule thereof. Examples are ω-carboxypolycaprolactone mono(meth)acrylate, monohydroxyethyl phthalate (meth)acrylate, (meth)acrylic acid, acrylic acid dimer, β-(meth)acryloyloxyethyl hydrogen succinate, 2-(meth)acryloyloxyethyl succinic acid, 2-(meth)acryloyloxyethyl phthalic acid, and 2-(meth)acryloyloxyethyl hexahydrophthalic acid. Above all, 2-acryloyloxyethyl hexahydrophthalic acid is preferred because it is superior in curability, can afford a cured product superior in weathering resistance and can retain a sheet shape.

It is preferable that a weight ratio of the ingredient (B) in the present invention be 5 to 40% by weight, more preferably 10 to 30% by weight. If it is less than 5% by weight, the adhesion to a glass substrate will be deteriorated, and if it exceeds 40% by weight, it will become difficult to maintain the state of sheet at room temperature.

The ingredient (C) used in the present invention is a photopolymerization initiator and imparts curability to the curable sheet composition. As examples of the ingredient (C) are mentioned acetophenone, diethoxyacetophenone, 2-methyl-1-[4-(methylthio)phenyl]-morpholinopropane-1, benzoin, benzoin ethyl ether, benzyl dimethyl ketal, benzophenone, benzyl, methylbenzoyl formate, thioxanthone, and diethylthioxantone. However, no limitation is made to these compounds. Conventional known photopolymerization initiators are employable. Particularly, the following compounds are employable: 2-hydroxy-2-methyl-1-phenylpropane-1-one, 4-(2-hydroxyethoxy)phenyl-(2-hydroxy-2-propyl)ketone, 4-(2-acryloyloxyethoxy)phenyl-(2-hydroxy-2-propyl)ketone, 1-hydroxycyclohexyl-phenylketone, 1-(4-isopropylphenyl)-2-hydroxy-2-methylpropane-1-one, 1-(4-dodecylphenyl)-2-hydroxy-2-methylpropane-1-one, 2-methyl-2- morpholino (4-thiomethylphenyl)propane-1-one, 2-benzyl-2-dimethylamino-1-(4-morpholinophenyl)-butanone, 2-hydroxy-2-methyl-1-[4-(1-methylvinyl)phenyl]propane oligomer. By using any of these compounds as a photopolymerization initiator it is possible to suppress the production of a volatile gas. Particularly, this effect can be exhibited outstandingly by an oligomer of 2-hydroxy-2-methyl-1-[4-(1-methylvinyl)phenyl]propane. These compounds may be used each alone or in combination of two or more.

It is preferable that a weight ratio of the ingredient (C) in the present invention be 0.3 to 10% by weight, more preferably 0.5 to 5% by weight. If it is more than 10% by weight, the storage stability of the composition will be deteriorated and so will be the physical properties of a cured product of the composition, and if it is less than 0.3% by weight, the photo-curability of the composition will be deteriorated.

The sum of the weight ratios of the ingredients (A), (B) and (C) is a value of not larger than 100.

The above are constituent ingredients of the curable sheet composition of the present invention, but other (meth)acryl compounds than the above (A) and (B), as well as known additives such as reactive diluents, thermoplastic polymers, leveling agents, colorants, slip agents, antioxidants, photostabilizers, inorganic fillers, ultraviolet light absorbers, polymerization inhibitors, and silane coupling agents, may be used as necessary insofar as they do not impair the performance of the composition. Particularly, the addition of an antioxidant and a photostabilizer is preferred for improving the storage stability of the curable sheet composition and for improving the weathering resistance of a cured molded product of the composition.

The following are examples of commodities available commercially as antioxidants or photostabilizers: SUMILIZER BHT, SUMILIZER 5, SUMILIZER BP-101, SUMILIZER GA-80, SUMILIZER TNP, SUMILIZER TPP-R, SUMILIZER P-16 (all are products of Sumitomo Chemical), Adekastab AO-20, Adekastab AO-30, Adekastab AO-40, Adekastab AO-50, Adekastab AO-60, Adekastab AO-70, Adekastab AO-80, Adekastab AO-330, Adekastab PEP-4C, Adekastab HP-10, Adekastab 2112, Adekastab 260 (all are products of Asahi Denka Kogyo), TINUVIN 770, TINUVIN 765, TINUVIN 144, TINUVIN 62, TINUVIN 111, TINUVIN 123, TINUVIN 292, Irganox 1010, Irganox 1035, Irganox 1076, Irganox 1098, Irganox 1135, Irganox 259 (all are products of Ciba Japan), FANCRYL FA-711M and FA-712HM (both are products of Hitachi Chemical), and chisorb 292 (a product of Double Bond. Chemical) (all are trade names).

The amounts of these antioxidants and photostabilizers are not specially limited, but are preferably in the range of 0.001 to 5 parts by weight, more preferably 0.01 to 3 parts by weight, based on 100 parts by weight of the resin ingredient.

As the method for forming the curable sheet composition of the present invention into a sheet shape there may be adopted a known method. For example, by diluting the composition of the present invention with a solvent into a coating solution, then applying the coating solution onto a substrate such as a polyester film having been subjected to a mold release treatment by, for example, flow coating, roll coating, gravure coating, WIREBAR, or lip die coating, and drying the solvent, there can be obtained the curable sheet composition of the present invention at a desired film thickness. The coating solution can be obtained by dilution with a solvent after mixing the ingredients (A) to (C) or by pre-dilution with a solvent before mixing the ingredients.

The present invention is also concerned with a method of curing the curable sheet composition by heating the composition to a temperature of 40° to 100° C., thereby allowing the composition to be softened or melted, and radiating actinic energy beam to the thus softened or melted composition.

The curable sheet composition of the present invention is applied onto a substrate, preferably glass, metal, plastic, or ceramic, then heated to a temperature of 40° to 100° C., preferably 60° to 90° C., and is thereby softened or melted into a liquefied flowing state. The liquefied flowing state can be represented in terms of a ratio of G" (loss elastic modulus) to G' (storage elastic modulus) which ratio is obtained when measuring a heat behavior of the sheet composition with a rheometer. Typically, it indicates a state in which the value of G'/G' is 1 or more. No special limitation is placed on the substrate onto which the composition is to be applied. However, glass is particularly preferred in point of adhesion and light transmittance which will be described later.

After the curable sheet composition of the present invention has assumed the above liquefied flowing state, actinic energy beam such as visible light, ultraviolet light, or gamma-ray, is radiated to the composition, whereby the composition undergoes a polymerization reaction and cures. The wavelength of the actinic energy beam to be radiated depends on the absorption wavelength of the photopolymerization initiator as the ingredient (C). By pressing a female mold against the curable sheet composition which is in a liquefied flowing state and curing the composition in this state, the composition can be molded into a desired shape. In the case where the female mold is formed of a material not permeating light, e.g., metal, a light-transmitting material such as glass is used as the substrate and actinic energy beam is radiated from the substrate surface.

The present invention is further concerned with a molded product obtained by the above method.

As examples of molded products obtained by the above method there are mentioned electric and electronic parts, coating substrates, and optical parts such as Fresnel lens, lenticular lens, prism lens, microlens, light reflecting lens, and hologram. The curable sheet composition of the present invention is superior in transparency and weathering resistance and is therefore suitable particularly for optical parts such as lenses. In case of using the composition for an optical part, it can be used in a directly molded state onto glass as the substrate The present invention will be described below in more detail by way of examples, provided the invention is not limited by the following examples.

Synthesis Example 1

Urethane Acrylate 1

582.26 parts by weight of methyl ethyl ketone, 59.94 parts by weight of isophorone diisocyanate, 0.05 part by weight of 4-methoxyphenol, and 0.1 part by weight of dibuyltin dilaurate, were charged into a glass reactor equipped with a thermometer, a stirrer and a reflux tube and heating was conducted to 60° C. under stirring. Then, 520 parts by weight of polycarbonate diol (T5652, a product of Asahi Kasei Chemicals, prepared from 1,5-pentanediol and 1,6-hexanediol as starting materials) which had been heated to 70° C. was added dropwise, and after completion of the dropwise addition, stirring was performed for 3 hours, allowing reaction to take place. Subsequently, 2.32 parts by weight of 2-hydroxyethyl acrylate was added dropwise, and after completion of the dropwise addition, stirring was performed for 3 hours, allowing reaction to take place. When vanishment of isocyanate groups was confirmed, it was determined that the reaction was terminated, and there was obtained polycarbonate urethane acrylate. As a result of GPC (gel permeation chromatography) measurement, this compound proved to have an Mw of 60,000.

Comparative Synthesis Example 1

Urethane Acrylate 2

Using 934.2 parts by weight of methyl ethyl ketone, 90 parts by weight of isophorone diisocyanate, 0.08 part by weight of 4-methoxyphenol, 0.16 part by weight of dibutyltin dilaurate, 700 parts by weight of polycarbonate diol (T5652, a product of Asahi Kasei Chemicals), and 11.6 parts by weight of 2-hydroxyethyl acrylate, synthesis was carried out in the same procedure as in Synthesis Example 1. Mw of the resultant compound was 15,000.

Comparative Synthesis Example 2

Urethane Acrylate 3

Using 2493.18 parts by weight of methyl ethyl ketone, 250.86 parts by weight of isophorone diisocyanate, 0.25 part by weight of 4-methoxyphenol, 0.5 part by weight of dibutyltin dilaurate, 2240 parts by weight of polycarbonate dial (T5652, a product of Asahi Kasei Chemicals), and 2.3 parts by weight of 2-hydroxyethyl acrylate, synthesis was carried out in the same procedure as in Synthesis Example 1. Mw of the resultant compound was 250,000.

Comparative Synthesis Example 3

Urethane Acrylate 4

Polyether urethane acrylate was prepared in the same amounts and procedure as in Synthesis Example 1 except that polyether diol (PTMG2000, a product of Mitsubishi Kagaku) was used instead of the polycarbonate dial. Mw of the compound thus prepared was 60,000.

Examples & Comparative Examples

Coating solutions of curable sheet compositions were prepared using the urethane acrylates prepared in Synthesis Example 1 and Comparative Synthesis Examples 1 to 3 and at such proportions as shown in Tables 1 and 2. Then, the coating solutions were each applied onto a PET film which had been subjected to a mold release treatment, and a film was formed using a bar coater so as to have a dry film thickness of 100 µm. A curable sheet composition was obtained by evaporating the diluent solvent in a drying oven. The proportions shown in the tables are on a weight basis unless otherwise mentioned.

Film Formability Test

The coating solutions were each applied onto a PET film which had been subjected to a mold release treatment, and a film was formed using a bar coater so as to have a dry film thickness of 100 µm. After evaporation of the diluent solvent in a drying oven, the state of the film was checked. Those having a uniform state after drying were determined to be acceptance, while those having cissing or fluidity were determined to be rejection.

Moldability Test:

Using a mold having a large number of prisms attached thereto continuously, each prism having a width of 100 µm and a height of 50 µm, the sheet compositions prepared in Examples and Comparative Examples were each subjected to press molding for 3 minutes at a temperature of 70° C. and a press pressure of 0.1 MPa, followed by irradiation of ultraviolet light to cure the composition and subsequent release from the mold to afford a cured molded product of the sheet composition. The shape of each of the cured molded products thus obtained and that of the mold were compared with each other using a non-contact type three-dimensional measuring instrument (Model NH-3, a product of Mitaka Koki). Those with comparison results of 5% or less in width and height were determined to be acceptance.

Adhesive Force Test:

The curable sheet compositions prepared in Examples and Comparative Examples each 10 mm×15 mm in size were each affixed to a glass plate of 5.0 mm×25 mm×100 mm. After removal of the substrate, the sheet composition was affixed to another glass plate and heating was conducted at 70° C. for 1 hour, followed by irradiation of ultraviolet light in an integrated light quantity of 30 kJ/m$^2$. The composition-glass plate combination thus treated was used as a test piece for evaluation. Both ends of the test piece were fixed to a chuck. In this state, a tensile shear load was imposed on the test piece at a pulling rate of 50 mm/min and a maximum load up to breakage of the test piece was measured, from which there was calculated a tensile shear adhesive strength. The test pieces having a tensile shear adhesive strength of 3.0 MPa or more were determined to be acceptance.

Transmittance Test:

The curable sheet compositions prepared in Examples and Comparative Examples were each affixed to the whole surface of a glass plate of 3.0 mm×25 mm×50 mm and irradiated with ultraviolet light in an integrated light quantity of 30 kJ/m$^2$. After removal of the substrate, the sheet composition was used as a test piece for evaluation. The test piece was then determined for total luminous transmittance with use of a turbidimeter (NDH2000, a product of Nippon Denshoku). The test pieces having a total luminous transmittance of 85% or more were determined to be acceptance.

Weathering Resistance Test:

The curable sheet compositions prepared in Examples and Comparative Examples were each affixed to a glass plate of 3.0 mm×75 mm×150 mm and then irradiated with ultraviolet light in an integrated light quantity of 30 kJ/m$^2$. After removal of the substrate, the curable sheet composition was used as a test piece for evaluation. The test piece was then subjected to a deterioration acceleration test for 1000 hours with use of a xenon arc weatherometer (Atlas•Ci4000, a product of Toyo Seiki Seisakusho) and the state of the test piece after the deterioration acceleration test was checked in terms of total luminous transmittance. The test pieces having a percent decrease from the initial total luminous transmittance of 5% or less were determined to be acceptance, while those having such a percent decrease of 5% or more were determined to be rejection.

TABLE 1

|  |  | Example 1 | Example 2 | Example 3 | Example 4 | Example 5 |
|---|---|---|---|---|---|---|
| Ingredient (A) | Urethane acrylate 1 (Synthesis Example 1) | 160 (80) | 160 (80) | 160 (80) | 180 (90) | 140 (70) |
| Ingredient (B) | 2-Acryloyloxyethyl phthalic acid | 20 |  |  |  |  |
|  | 2-Acryloyloxyethyl hexahydrophthalic acid |  | 20 | 20 | 10 | 30 |
| Ingredient (C) | Photopolymerization initiator 1 | 3 | 3 |  | 3 | 3 |
|  | Photopolymerization initiator 2 |  |  | 3 |  |  |
| Evaluation Test | Film Formability | ⊚ | ⊚ | ⊚ | ⊚ | ○ |
|  | Moldability | ○ | ○ | ○ | ○ | ○ |
|  | Adhesive Force | ○ | ○ | ○ | ○ | ⊚ |
|  | Total Luminous Transmittance | ○ | ○ | ○ | ○ | ○ |
|  | Weathering Resistance | ○ | ⊚ | ⊚ | ⊚ | ⊚ |

TABLE 2

|  |  | Comparative Example 1 | Comparative Example 2 | Comparative Example 3 | Comparative Example 4 | Comparative Example 5 | Comparative Example 6 |
|---|---|---|---|---|---|---|---|
| Ingredient (A) | Urethane acrylate 1 (Synthesis Example 1) | 160 (80) | 200 (100) | 100 (50) |  |  |  |
|  | Urethane acrylate 2 (Comparative Synthesis Example 1) |  |  |  | 160 (80) |  |  |
|  | Urethane acrylate 3 (Comparative Synthesis Example 2) |  |  |  |  | 160 (80) |  |
|  | Urethane acrylate 4 (Comparative Synthesis Example 3) |  |  |  |  |  | 160 (80) |
| Ingredient (B) | 2-Acryloyloxyethyl hexahydrophthalic acid |  |  | 50 | 20 | 20 | 20 |
|  | 2-Phenoxyethyl acrylate | 20 |  |  |  |  |  |
| Ingredient (C) | Photopolymerization initiator 1 | 3 | 3 | 3 | 3 | 3 | 3 |
| Evaluation Test | Film Formability | X | ○ | X | X | ○ | ○ |
|  | Moldability | ○ | ○ | ○ | ○ | X | ○ |
|  | Adhesive Force | X | X | ⊚ | ○ | ○ | ○ |
|  | Total Luminous Transmittance | ○ | ○ | ○ | ○ | ○ | ○ |
|  | Weathering Resistance | ○ | ⊚ | ⊚ | ⊚ | ⊚ | X |

In the above table, the parenthesized values each represent the weight of the resin component exclusive of the diluent solvent, ⊚ stands for "acceptance: very good," ○ stands for "acceptance: good," x stands for "rejection."

In the above tables, the photopolymerization initiator 1 is 1-hydroxycyclohexyl phenyl ketone (Irgacure 184, a product of Ciba Speciality Chemical) and the potopolymerization initiator 2 is 2-benzoylpropane-2-ol (Dalocure, a product of Merck).

In Examples 1 to 5 there were obtained good results in film formability, moldability, adhesive force, transmittance and weathering resistance. Above all, in Examples 2 to 5 and Comparative Examples 3 to 5 using 2-acryloyloxyethyl hexahydrophthalic acid, weathering resistance was good.

In Comparative Example 1, film formability was not satisfactory and adhesive force was low. In Comparative Example 2, adhesive force was low. In Comparative Examples 3 and 4, it was difficult to form a film. In Comparative Example 5, moldability was not satisfactory. In Comparative Example 6, weathering resistance was not satisfactory.

INDUSTRIAL APPLICABILITY

The curable sheet composition of the present invention permits direct formation of an optical element onto a glass substrate without the need of pre-treatment for the glass substrate, and hence it is possible to improve the production efficiency. Besides, a cured molded product of the composition has a high weathering resistance, thus making it possible to produce optical elements suitable for outdoor use over a long period.

The invention claimed is:

1. A curable sheet composition being in a solid state at room temperature, capable of being liquefied and flowing upon heating, and comprising:
    (A) 50 to 94% by weight of a urethane (meth)acrylate oligomer prepared by a reaction of a polycarbonate diol (a1), a diisocyanate (a2), and a (meth)acrylate (a3) containing at least one hydroxyl group in molecule,
    (B) 5 to 40% by weight of 2-acryloyloxyethyl hexahydrophthalic acid, and
    (C) 0.3 to 10% by weight of a photopolymerization initiator.

2. A method for curing a curable sheet composition being in a solid state at room temperature, capable of being liquefied and flowing upon heating, and comprising:
    (A) 50 to 94% by weight of a urethane (meth)acrylate oligomer prepared by the reaction of a polycarbonate diol (a1), a diisocyanate (a2), and a (meth)acrylate (a3) containing at least one hydroxyl group in molecule, (B) 5 to 40% by weight of 2-acryloyloxyethyl hexahydrophthalic acid, and (C) 0.3 to 10% by weight of a photopolymerization initiator, which method comprises applying the curable sheet composition onto a substrate, heating to a temperature of 40° to 100° C., thereby allowing the composition to soften or melt, and radiating actinic energy beam to the softened or melted composition to cure the composition.

3. A method as set forth in claim 2, wherein the substrate is glass.

4. A molded product cured and molded by the method described in claim 2.

5. A molded product as set forth in claim 4, which is an optical part.

6. A curable sheet composition as set forth in claim 1, wherein the diol compound as a monomer constituent of the polycarbonate diol (a1) is a diol compound having hydroxyl groups at both ends of a divalent aliphatic group having 4 to 6 main chain carbon atoms.

7. A curable sheet composition as set forth in claim 6, wherein an average molecular weight of the urethane (meth)acrylate oligomer (A) is 20,000 to 200,000.

8. A curable sheet composition as set forth in claim 1, wherein an average molecular weight of the urethane (meth)acrylate oligomer (A) is 20,000 to 200,000.

9. A method for curing the curable sheet composition described in claim 8, which method comprises applying the curable sheet composition onto a substrate, heating to a temperature of 40° to 100° C., thereby allowing the composition to soften or melt, and radiating actinic energy beam to the softened or melted composition to cure the composition.

10. A method for curing the curable sheet composition described in claim 7, which method comprises applying the curable sheet composition onto a substrate, heating to a temperature of 40° to 100° C., thereby allowing the composition to soften or melt, and radiating actinic energy beam to the softened or melted composition to cure the composition.

11. A method for curing the curable sheet composition described in claim 6, which method comprises applying the curable sheet composition onto a substrate, heating to a temperature of 40° to 100° C., thereby allowing the composition to soften or melt, and radiating actinic energy beam to the softened or melted composition to cure the composition.

12. A molded product cured and molded by the method described in claim 3.

* * * * *